(12) United States Patent
Sasaki et al.

(10) Patent No.: US 10,565,730 B2
(45) Date of Patent: Feb. 18, 2020

(54) SURVEY DATA PROCESSING DEVICE, SURVEY DATA PROCESSING METHOD, AND SURVEY DATA PROCESSING PROGRAM

(71) Applicant: TOPCON CORPORATION, Itabashi-ku, Tokyo (JP)

(72) Inventors: Takeshi Sasaki, Tokyo (JP); Nobuyuki Fukaya, Tokyo (JP); Nobuyuki Nishita, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 16/107,392

(22) Filed: Aug. 21, 2018

(65) Prior Publication Data

US 2019/0073794 A1 Mar. 7, 2019

(30) Foreign Application Priority Data

Sep. 6, 2017 (JP) .................................. 2017-171289

(51) Int. Cl.
*G06T 7/73* (2017.01)
*G06K 9/00* (2006.01)
(Continued)

(52) U.S. Cl.
CPC .............. *G06T 7/75* (2017.01); *G06K 9/0063* (2013.01); *G06K 9/6215* (2013.01); *G06T 7/593* (2017.01);
(Continued)

(58) Field of Classification Search
CPC ........... G06T 7/75; G06T 7/593; G06T 15/20; G06T 17/05; G06T 2207/30181;
(Continued)

(56) References Cited

U.S. PATENT DOCUMENTS 7,861,423 B2   1/2011 Kumagai et al.
2009/0235541 A1   9/2009 Kumagai et al.
(Continued)

FOREIGN PATENT DOCUMENTS

EP   2511781 A1   10/2012
EP   2772725 A2    9/2014
(Continued)

OTHER PUBLICATIONS

Extended Search Report dated Feb. 12, 2019, in connection with European Patent Application Serial No. 18190423.6, 8 pgs.

*Primary Examiner* — John R Schnurr
(74) *Attorney, Agent, or Firm* — Chiesa Shahinian & Giantomasi PC (57) ABSTRACT

A technique is provided to enable reduction in cost relating to installation of orientation targets in aerial photogrammetry. A survey data processing device includes a positioning data receiving unit, a relative orientation unit, an absolute orientation unit, and an adjustment calculation executing unit. The positioning data receiving unit receives positioning data obtained by tracking and positioning a reflective prism of an aerial vehicle by a total station. The aerial vehicle also has a camera. The relative orientation unit calculates relative exterior orientation parameters of the camera by relative orientation using photographed images taken by the camera. The absolute orientation unit provides a true scale to the relative exterior orientation parameters by absolute orientation using the positioning data and the relative exterior orientation parameters. The adjustment calculation executing unit corrects the relative exterior orientation parameters having the true scale, by using a positional relationship between the camera and the reflective prism.

6 Claims, 7 Drawing Sheets

(51) Int. Cl.
   *G06T 17/05*    (2011.01)
   *G06T 7/593*    (2017.01)
   *G06T 15/20*    (2011.01)
   *H04N 13/275*   (2018.01)
   *H04N 13/204*   (2018.01)
   *G06K 9/62*     (2006.01)

(52) U.S. Cl.
   CPC .............. *G06T 15/20* (2013.01); *G06T 17/05* (2013.01); *H04N 13/204* (2018.05); *H04N 13/275* (2018.05); *G06T 2207/30181* (2013.01)

(58) Field of Classification Search
   CPC .... H04N 13/204; H04N 13/275; G01C 11/08; G01C 15/002; G06K 9/0063; G06K 9/6215
   See application file for complete search history.

(56) References Cited

U.S. PATENT DOCUMENTS

| | | | |
|---|---|---|---|
| 2012/0242830 A1 | 9/2012 | Kumagai et al. | |
| 2012/0256916 A1 | 10/2012 | Kitamura et al. | |
| 2013/0236107 A1 | 9/2013 | Fukaya et al. | |
| 2014/0032021 A1* | 1/2014 | Metzler ................. | G01S 5/0036 701/3 |
| 2014/0055613 A1* | 2/2014 | Ohtomo ................. | H04N 7/18 348/144 |
| 2014/0119716 A1* | 5/2014 | Ohtomo ................. | G01C 11/00 396/8 |
| 2014/0210663 A1* | 7/2014 | Metzler ................. | G01C 15/00 342/357.34 |
| 2014/0240498 A1* | 8/2014 | Ohtomo ................. | B64D 47/08 348/144 |
| 2015/0206023 A1 | 7/2015 | Kochi et al. | |
| 2016/0131479 A1* | 5/2016 | Kumagai ............... | G01C 15/06 |
| 2016/0253808 A1* | 9/2016 | Metzler ................. | G05D 1/0094 382/103 |
| 2018/0172843 A1 | 6/2018 | Nishita et al. | |
| 2018/0197421 A1 | 7/2018 | Ogawa et al. | |

FOREIGN PATENT DOCUMENTS

| | | |
|---|---|---|
| JP | 2009-229192 A | 10/2009 |
| JP | 2012-202821 A | 10/2012 |
| JP | 2012-230594 A | 11/2012 |
| JP | 5124319 B2 | 1/2013 |
| JP | 2013-178656 A | 9/2013 |
| JP | 2013-186816 A | 9/2013 |
| JP | 2014-006148 A | 1/2014 |
| JP | 2014-035702 A | 2/2014 |
| JP | 2018-054541 A | 4/2018 |
| JP | 2018-100931 A | 6/2018 |
| JP | 2018-112445 A | 7/2018 |
| WO | 2011070927 A1 | 4/2013 |

* cited by examiner

SURVEY DATA PROCESSING DEVICE, SURVEY DATA PROCESSING METHOD, AND SURVEY DATA PROCESSING PROGRAM

CROSS-REFERENCE TO RELATED APPLICATIONS

This application is based upon and claims benefit of priority from Japanese Patent Application No. 2017-171289, filed Sep. 6, 2017, the entire contents of which are incorporated herein by reference.

BACKGROUND OF THE INVENTION

The present invention relates to a technique for calculating exterior orientation parameters of a camera mounted on an aerial vehicle.

Technologies using an unmanned aerial vehicle (UAV) in aerial photogrammetry are publicly known. In these techniques, a three-dimensional model of an object to be surveyed is generated by using photographed images of the object, which are taken from a UAV. The object to be surveyed is, for example, a ground surface. According to this technique, orientation is first performed by using multiple photographed images containing the same object, to calculate exterior orientation parameters (location and attitude) of a camera mounted on the UAV, and a process relating to generation of a three-dimensional model is performed by using the exterior orientation parameters. The technique of calculating exterior orientation parameters of a camera in the field of aerial photogrammetry is, for example, disclosed in Japanese Unexamined Patent Application Laid-Open No. 2014-006148.

According to an existing technique, multiple orientation targets are installed on a ground surface, and the locations of the orientation targets are measured in advance. In this condition, exterior orientation parameters of a camera corresponding to each of aerial photographed images are calculated by a method of resection with use of the orientation targets contained in the aerial photographed images. This technique has a drawback in the costs relating to installation and positioning of the orientation targets. Moreover, installation of the orientation targets is difficult depending on geographic features.

SUMMARY OF THE INVENTION

In view of these circumstances, an object of the present invention is to provide a technique that enables reduction in cost relating to installation of orientation targets in aerial photogrammetry.

A first aspect of the present invention provides a survey data processing device including a positioning data receiving unit and an operation unit. The positioning data receiving unit receives positioning data. The positioning data is obtained through tracking and positioning a reflective prism of an aerial vehicle by a total station. The aerial vehicle has a camera and the reflective prism. The operation unit calculates relative exterior orientation parameters of the camera by relative orientation using photographed images taken by the camera, obtains absolute values for the relative exterior orientation parameters by absolute orientation on the basis of the positioning data and the relative exterior orientation parameters, and corrects the absolute values for the relative exterior orientation parameters on the basis of a position relationship between the camera and the reflective prism, which is preliminarily obtained.

According to a second aspect of the present invention, in the first aspect of the present invention, the relative orientation may provide a relative movement path of the camera with respect to an object in the photographed image, and the absolute orientation may perform coordinate conversion of the relative movement path to a positioning data-based movement path of the camera and thereby provide the absolute values to the relative exterior orientation parameters.

According to a third aspect of the present invention, in the first or the second aspect of the present invention, the relative orientation may enable generation of a relative three-dimensional model in which a relative relationship between the object in the photographed image and exterior orientation parameters of the camera at a time of taking the photographed image. In this case, the absolute orientation may perform scale adjustment, parallel movement, and rotation movement of the relative three-dimensional model so that a relative movement path of the camera in the relative three-dimensional model is fit to the positioning data-based movement path of the camera.

According to a fourth aspect of the present invention, in any one of the first to the third aspects of the present invention, the survey data processing device may further include a positioning data correcting unit that corrects the positioning data of the reflective prism on the basis of an incident angle of distance measuring light and tracking light from the total station to the reflective prism.

A fifth aspect of the present invention provides a survey data processing device that processes positioning data. The positioning data is obtained through tracking and positioning a reflective prism, which is mounted on an aerial vehicle, by a total station. This device includes a positioning data correcting unit that corrects the positioning data of the reflective prism on the basis of an incident angle of distance measuring light and tracking light from the total station to the reflective prism.

According to a sixth aspect of the present invention, in the fourth or the fifth aspect of the present invention, the positioning data may be corrected on the basis of an orientation direction of the total station. According to a seventh aspect of the present invention, in the sixth aspect of the present invention, the positioning data may be corrected on the basis of attitude of the camera in addition to the orientation direction of the total station.

An eighth aspect of the present invention provides a survey data processing method including receiving positioning data. The positioning data is obtained through tracking and positioning a reflective prism of an aerial vehicle by a total station. The aerial vehicle is mounted with a camera and the reflective prism. The method also includes calculating relative exterior orientation parameters of the camera by relative orientation using photographed images taken by the camera, obtaining absolute values for the relative exterior orientation parameters by absolute orientation on the basis of the positioning data and the relative exterior orientation parameters, and correcting the absolute values for the relative exterior orientation parameters on the basis of a position relationship between the camera and the reflective prism, which is preliminarily obtained.

A ninth aspect of the present invention provides a non-transitory computer recording medium storing computer executable instructions for processing survey data that, when executed by a computer processor, cause the computer processor to receive positioning data. The positioning data is obtained through tracking and positioning a reflective prism of an aerial vehicle by a total station. The aerial vehicle is mounted with a camera and the reflective prism. The computer executable instructions also cause the computer processor to calculate relative exterior orientation parameters of the camera by relative orientation using photographed images taken by the camera, calculate absolute values for the relative exterior orientation parameters by absolute orientation on the basis of the positioning data and the relative exterior orientation parameters, and correct the absolute values for the relative exterior orientation parameters on the basis of a position relationship between the camera and the reflective prism, which is preliminarily obtained.

The present invention provides a technique that enables reduction in cost relating to installation of orientation targets in aerial photogrammetry.

DETAILED DESCRIPTION OF THE EMBODIMENTS

Figure 1:
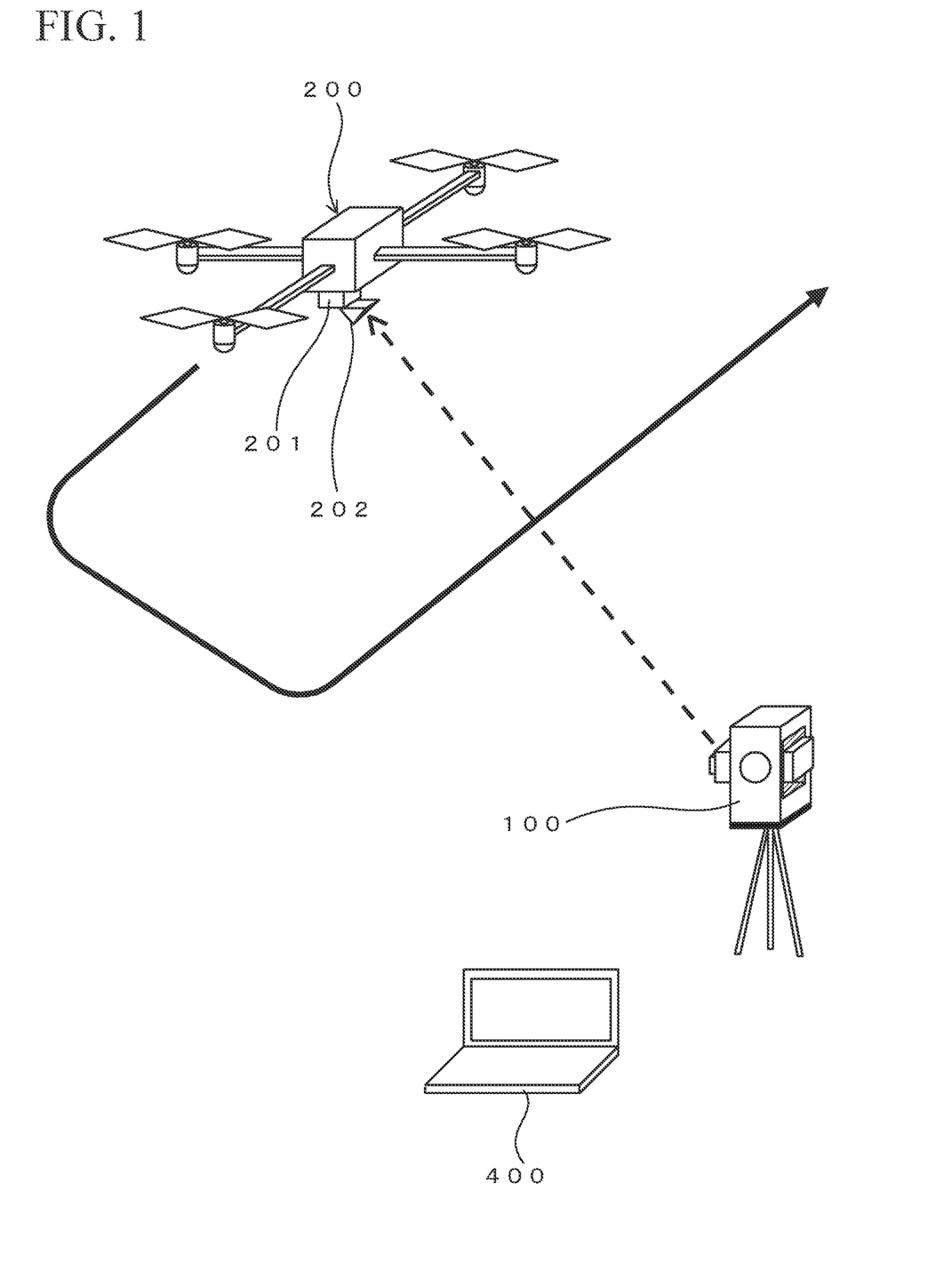
FIG. 1 shows a general conceptual view of an embodiment.

1. First Embodiment
Outline
FIG. 1 shows a general view of this embodiment. FIG. 1 shows a total station (TS) 100, a UAV 200, and a survey data processing device 400 constituted by using a personal computer (PC). The UAV 200 performs photographing of the ground by using a camera 201 while flying. The UAV 200 is tracked by the TS 100, and a three-dimensional location of the UAV 200 is sequentially measured. The TS 100 tracks the UAV 200 by tracking a reflective prism 202 mounted on the UAV 200, with tracking light. The TS 100 positions the UAV 200 by calculating direction and a distance of the UAV 200 as viewed from the TS 100 by means of laser distance measurement targeting the reflective prism 202.

The TS 100 is installed at a known three-dimensional location in an absolute coordinate system. Thus, measuring the direction and the distance of the UAV 200 as viewed from the TS 100 enables determination of a three-dimensional location of the UAV 200 in the absolute coordinate system.

The absolute coordinate system describes map information and is fixed relative to the ground, and therefore, the absolute coordinate system can also be called a "map coordinate system". Normally, a coordinate system used by a GNSS is the absolute coordinate system or the map coordinate system. The absolute coordinate system may be described in terms of latitude, longitude, and elevation or height above mean sea level. In an example of directions of coordinate axes of the absolute coordinate system, an X-axis is set to direct the east, a Y-axis is set to direct the north, and a Z-axis is set to direct a vertical upward.

The TS 100 can be constituted of a commercially available device. The details of the TS 100 may be found in Japanese Unexamined Patent Applications Laid-Open Nos. 2009-229192 and 2012-202821, for example. Techniques for making the TS 100 track and position the UAV 200 may be found in Japanese Patent Applications Nos. 2016-247917 and 2017-002419, for example. In addition, a technique relating to detection and tracking of a target, such as the reflective prism 202, by a TS, may be found in Japanese Patent No. 5124319, for example.

The UAV 200 is constituted by mounting a camera 201 and a reflective prism 202 to a commercially available aerial vehicle. The UAV 200 includes a flight control unit, an inertial measurement unit (IMU), a storage for storing a flight plan, a flight log, and other information, a wireless communication unit, and a GNSS location identifying unit. In this embodiment, relationships of position and attitude among the camera 201, the reflective prism 202, the IMU, and the GNSS location identifying unit are preliminarily examined and are already known.

The UAV 200 flies in accordance with a predetermined flight plan and photographs a survey target, such as a ground surface, by using the camera 201 while in flight. The photographing is performed at a specific interval, such as an interval of one second or two seconds, to take a large number of photographed images containing the same photographed object that is incrementally shifted in the photographed images, along a flight path. The data of the photographed images taken by the camera 201 is stored in the flight log in conjunction with data of photographing time, attitude of the UAV 200 or of the camera 201 measured by the IMU at the photographing time, and location of the UAV 200 or of the camera 201 measured by the GNSS location identifying unit at the photographing time. The flight log data is collected after the flight is completed, and the collected flight log data is processed by the survey data processing device 400.

To achieve increase in the accuracy of the aerial photogrammetry, the accuracy of the exterior orientation parameters (location and attitude) of the camera 201 at the photographing time of each image should be considered. In this embodiment, the accuracy of the exterior orientation parameters of the camera 201 is increased by the following procedure.

Outline of Process Flow
(1) Relative Orientation
With use of multiple aerial photographed images, a relative three-dimensional model with a freely selected scale is generated, and a relative relationship between a feature point identified among the multiple images and location and attitude of the camera 201 at the photographing time of each of the multiple images is determined.

(2) Absolute Orientation
The location of the camera 201 that is measured by the TS 100 by using the location of the reflective prism 202 is used to add a scale and actual values to the relative three-dimensional model, which is generated by means of the relative orientation of the process (1), and absolute values for the exterior orientation parameters in the absolute coordinate system of the camera 201 are calculated (3) First Adjustment Calculation A bundle adjustment calculation as well as an adjustment calculation in consideration of a relationship of location between the reflective prism and the camera are performed concurrently so that location of feature points and the exterior orientation parameters of the camera 201 will be optimized.

(4) Second Adjustment Calculation

The first adjustment calculation of the process (3) is performed again in consideration of deviation of position of a reflection point of the reflective prism 202 depending on the incident angle of the distance measuring light and the tracking light from the TS 100, to further optimize the location of the feature point and the exterior orientation parameters of the camera 201.

Details of Processes (1) Relative Orientation

Hereinafter, details of the relative orientation are described by using, for convenience of explanation, two photographed images. The two photographed images are taken from different positions so as to contain the same object. The two photographed images are called "base images for a stereoscopic image" hereinafter. It is assumed that the UAV 200 consecutively photographs the ground surface by using the camera 201 while flying and obtains a great number of aerial photographed images. In this case, two aerial photographed images containing the same photographed area and photographed at very short time intervals are selected as base images for a stereoscopic image. Since the UAV 200 performs photographing at a predetermined time interval, the stereoscopic image is composed of two images that are taken from different points of view that contain the same object.

Figure 2:
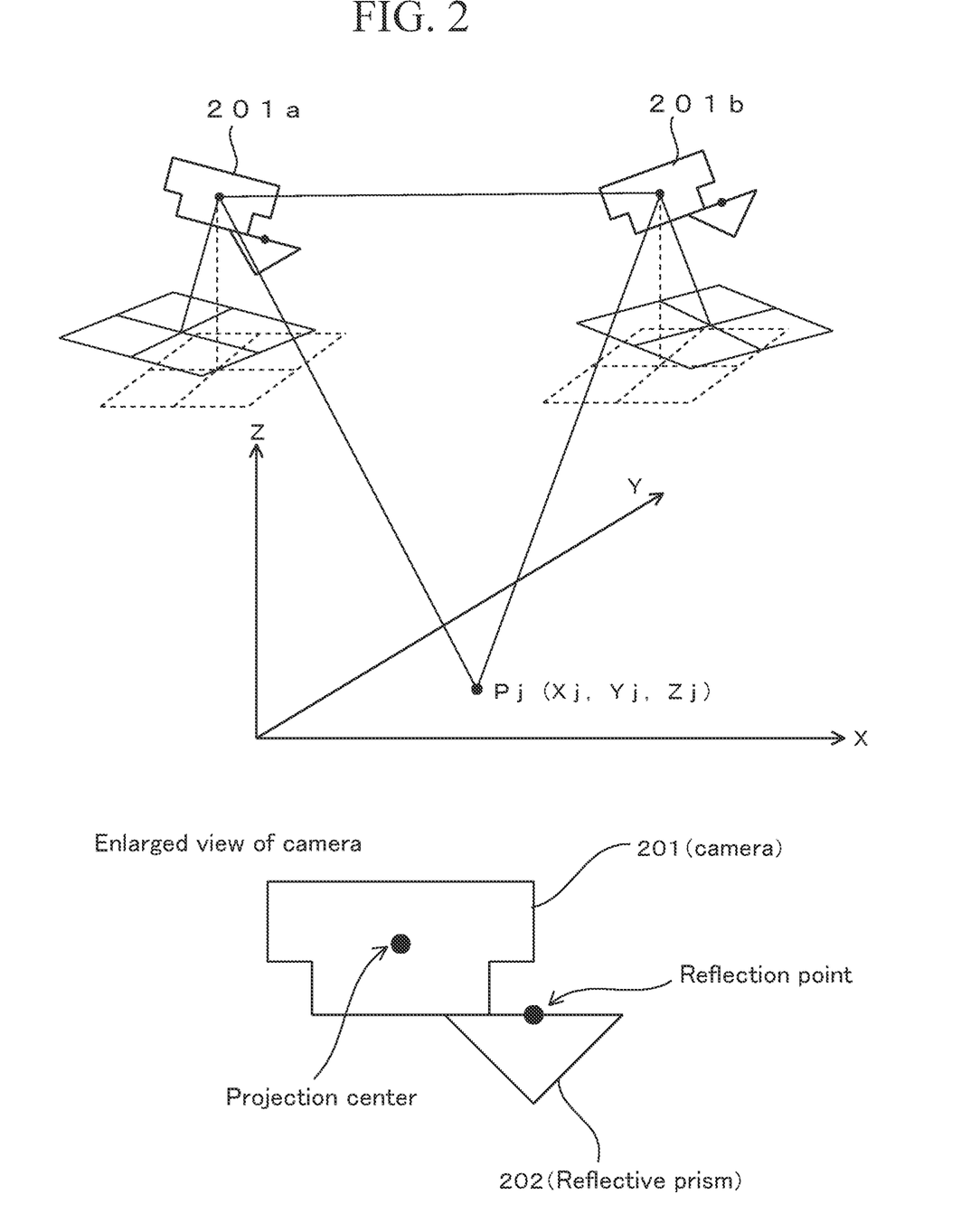
FIG. 2 shows an image diagram showing a principle of orientation.

FIG. 2 shows an image diagram showing a case in which a camera 201a representing the camera 201 at time t1 photographs an area of a ground surface and a camera 201b representing the camera 201 at time t2 also photographs the same area. The time t2 is after the time t1.

In this process, first, feature points are extracted from each of a first image and a second image that are respectively taken by the camera 201a and 201b. Thereafter, correspondence relationships of the feature points between the first and the second images are determined. These techniques may be found in Japanese Unexamined Patent Applications Laid-Open Nos. 2013-186816 and 2013-178656, for example. Japanese Unexamined Patent Application Laid-Open No. 2013-186816 discloses details of extraction of feature points, matching of the feature point between two images, methods of intersection and resection, each type of orientation, calculation of a three-dimensional location of the feature point, bundle adjustment, and other processes.

FIG. 2 shows a common feature point Pj that is extracted from the first and the second images. Although a great number of feature points common to the two images are extracted, only one feature point Pj is illustrated in FIG. 2 for simplicity in this embodiment.

In the process of the relative orientation, direction and location of the cameras 201a and 201b are adjusted so that a positional difference of the feature point between the first and the second images taken by the cameras 201a and 201b will be eliminated, and relative exterior orientation parameters (location and attitude) of the cameras 201a and 201b are calculated. At this stage, a true scale, such as coordinate values and values of the attitude in the absolute coordinate system, is not obtained, and therefore, the obtained exterior orientation parameters represent a relative position relationship and a relative attitude (direction) relationship between the cameras 201a and 201b.

In the case illustrated in FIG. 2, the relative orientation provides a relative position relationship between the camera 201a, the camera 201b, and the feature point Pj, and also provides two angles that form a triangle shape with a vertex at the feature point Pj. The size of the triangle is not determined, and the triangle is a relative figure, because a true scale is still not provided.

The relative orientation is performed to all of usable photographed images that are taken by the camera 201, thereby providing relative exterior orientation parameters of the camera 201 at each of the locations of the points of view corresponding to each of the photographed images. Although an example of the relative orientation using two images as base images for a stereoscopic image is described above, the relative orientation is performed by using three or a greater number of images containing the same object in actual use.

Figure 3:
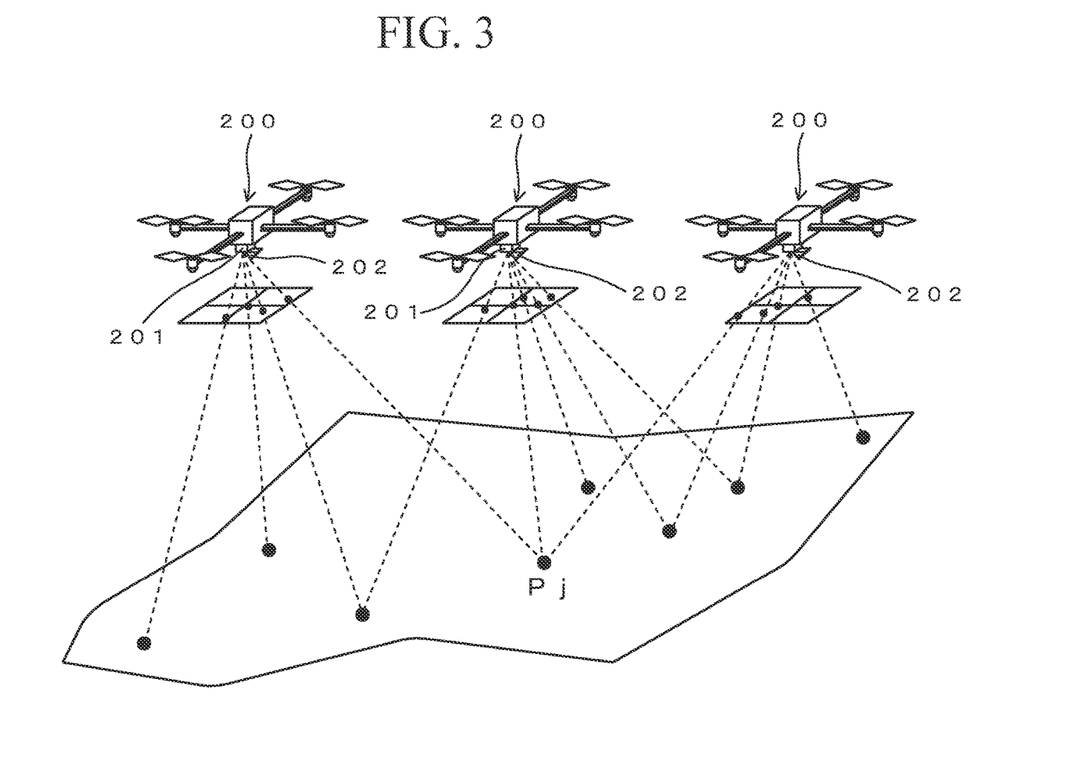
FIG. 3 shows another image diagram showing the principle of the orientation.

The relative position relationship and the relative attitude relationship are obtained with respect to each of locations of the camera at which multiple images are respectively taken. This provides a relative three-dimensional model in which relative relationships between the great number of feature points and the locations and the attitudes of the camera are determined. FIG. 3 schematically shows a principle for generating a relative three-dimensional model in which relative relationships between location and direction of a camera taking multiple images and locations of feature points that are the same in the multiple images are determined. This relative three-dimensional model does not have a true scale, and a relationship of the relative three-dimensional model to the absolute coordinate system is not yet known at the stage of the relative orientation.

(2) Absolute Orientation

If locations in the absolute coordinate system of the multiple feature points in FIG. 3 are obtained, a true scale is added to the relative model in FIG. 3, and direction in the absolute coordinate system of the camera 201 is also determined. This is a principle of an existing absolute orientation using orientation targets.

In this embodiment, a true scale is added to the relative orientation-based relative three-dimensional model without using an orientation target. Thus, the relative three-dimensional model, as illustrated in FIG. 3, can be described in the absolute coordinate system. The following describes absolute orientation of this embodiment.

In this process, a movement trajectory of the camera 201 in the relative three-dimensional model illustrated in FIG. 3 is considered. As illustrated in FIG. 1, in this embodiment, the movement trajectory of the camera 201 or of the reflective prism 202 of the UAV 200 is tracked and positioned by the TS 100, and thus, the trajectory is determined in the absolute coordinate system.

Based on this, the location of the reflective prism 202 is used as the location of the camera 201, and scale adjustment, parallel movement, and rotational movement of the relative three-dimensional model are performed so that the movement trajectory of the camera 201 in the relative three-dimensional model will be fit to the movement trajectory of the camera 201 in the absolute coordinate system, which is positioned by the TS 100.

The fitting of the movement trajectory of the camera 201 in the relative three-dimensional model to the positioning data obtained by the TS 100 enables the movement trajectory of the camera 201 in the relative three-dimensional model to be described in the absolute coordinate system. In this embodiment, the movement trajectory is a trajectory of the location of the camera 201 at each time. Thus, a true scale and actual values are added to the locations of the camera 201 in the relative three-dimensional model. The addition of actual values to each of the locations of the camera in the relative three-dimensional model provides values in the absolute coordinate system to each of attitudes of the camera in the relative three-dimensional model. Moreover, actual location of each of the feature points in the relative three-dimensional model is also obtained. This process thus provides actual values in terms of absolute value in the absolute coordinate system for each of the parameters in the relative orientation-based relative three-dimensional model.

In this embodiment, actual values in the absolute coordinate system are used as absolute values. For example, latitude, longitude, and elevation are used for the absolute values of a location. The direction of a vector in an XYZ coordinate system having an X-axis in the north direction, a Y-axis in the east direction, and a Z-axis in the vertical upward direction is an absolute value of an attitude. Alternatively, a coordinate system having the origin at the TS 100, that is, a TS coordinate system, can be used instead of the absolute coordinate system. In this case, absolute values of the feature points and the exterior orientation parameters of the camera 201 are described in the TS coordinate system.

The relative three-dimensional model obtained by the principle in FIG. 3 contains a margin of error in addition to a margin of error due to use of the location of the prism 202 as the location of the camera 201 in the absolute orientation. This causes the fitting of the trajectory of the location of the camera in the absolute orientation to be imperfect and to contain a margin of error. Consequently, values of the feature points and the exterior orientation parameters of the camera 201, which are obtained by the absolute orientation, also contain a margin of error.

As described above, the absolute orientation of this embodiment uses the movement trajectory of the camera 201 to provide values in the absolute coordinate system to the movement trajectory of the camera 201 in the relative three-dimensional model used in the relative orientation, thereby adding a true scale to the relative three-dimensional model. That is, the relative three-dimensional model used in the relative orientation is subjected to coordinate conversion to locations of the camera 201 positioned by the TS 100, to determine the scale and the direction of the relative coordinate system in the absolute coordinate system.

The absolute orientation determines three-dimensional locations of the feature points in each image and the exterior orientation parameters (location and attitude) of the camera 201 corresponding to the each image.

(3) First Adjustment Calculation

The locations of the feature points and the exterior orientation parameters, which are obtained by the absolute orientation of the process (2), contain a margin of error. To reduce this margin of error, an adjustment calculation described below is performed. In the adjustment calculation, observation equations represented by the first and the second formulas are established, and each of the parameters, that is, the feature points $(X_j, Y_j, Z_j)$ and the exterior orientation parameters $(X_{0i}, Y_{0i}, Z_{0i}, a_{11i}$ to $a_{33i})$ are optimized by the least squares method. The parameters $(a_{11i}$ to $a_{33i})$ are of a rotation matrix.

First Formula $$\sum_{i=1}^{m}\sum_{j=1}^{n}\left\{-c\frac{a_{11i}(X_j-X_{0i})+a_{12i}(Y_j-Y_{0i})+a_{13i}(Z_j-Z_{0i})}{a_{31i}(X_j-X_{0i})+a_{32i}(Y_j-Y_{0i})+a_{33i}(Z_j-Z_{0i})}-x_{ij}\right\}^2$$

$$\sum_{i=1}^{m}\sum_{j=1}^{n}\left\{-c\frac{a_{21i}(X_j-X_{0i})+a_{22i}(Y_j-Y_{0i})+a_{21i}(Z_j-Z_{0i})}{a_{31i}(X_j-X_{0i})+a_{32i}(Y_j-Y_{0i})+a_{33i}(Z_j-Z_{0i})}-y_{ij}\right\}^2$$

In the first formula, "c" represents a picture distance or a focal distance,
$(X_j, Y_j, Z_j)$ represents three-dimensional coordinates of a target feature point,
$(x_{ij}, y_{ij})$ represents image coordinates of a point "j" in an image "i",
$(X_{0i}, Y_{0i}, Z_{0i})$ represents a location of the camera 201 at the photographing time of the image "i", and $(a_{11i}$ to $a_{33i})$ represent a rotation matrix showing an attitude of the camera 201 at the photographing time of the image "i".

Second Formula $$\sum_{i=1}^{m}\{X_{0i}-(X_{pi}+a_{11i}L_X+a_{12i}L_Y+a_{13i}L_Z)\}^2$$

$$\sum_{i=1}^{m}\{Y_{0i}-(Y_{pi}+a_{21i}L_X+a_{22i}L_Y+a_{23i}L_Z)\}^2$$

$$\sum_{i=1}^{m}\{Z_{0i}-(Z_{pi}+a_{31i}L_X+a_{32i}L_Y+a_{33i}L_Z)\}^2$$

In the second formula, $(X_{pi}, Y_{pi}, Z_{pi})$ represents a location of the reflective prism 202 at the photographing time of the image "i", and
$(L_x, L_y, L_z)$ represents a separated distance between the position of the camera 201 at the projection center and the reflection point of the reflective prism 202.

The first formula uses three-dimensional coordinates of the feature point in the absolute orientation-based three-dimensional model in the absolute coordinate system, as initial values for $(X_j, Y_j, Z_j)$. The initial values for $(X_{0i}, Y_{0i}, Z_{0i})$ use a location of the camera 201 in the absolute orientation-based three-dimensional model. The initial values for $(a_{11i}$ to $a_{33i})$ use values of the rotation matrix showing the attitude of the camera 201 in the absolute orientation-based three-dimensional model. The values for $(X_{pi}, Y_{pi}, Z_{pi})$ use the data of location of the reflective prism 202 positioned by the TS 100.

The first formula is an observation equation for performing a bundle adjustment calculation. In the bundle adjustment calculation, the observation equation of the first formula is established with respect to each one light bundle of each image on the basis of a collinearity condition in which a light bundle connecting a feature point of an object to be measured, a point in the image, and a projection center must be on the same straight line. Then, coordinates $(X_j, Y_j, Z_j)$ of the feature point and parameters $(X_{0i}, Y_{0i}, Z_{0i}, a_{11i}$ to $a_{33i})$ of the exterior orientation parameters are adjusted concurrently by the least squares method.

The second formula is an observation equation for performing an adjustment calculation in consideration of the difference of the position between the camera 201 and the reflective prism 202. The parameters $(L_x, L_y, L_z)$ are known parameters that determine the position relationship between the camera 201 and the reflective prism 202 in a coordinate system fixed relative to the UAV 200.

In the adjustment calculation using the first and the second formulas, the feature point $(X_j, Y_j, Z_j)$ and the exterior orientation parameters $(X_{Oi}, Y_{Oi}, Z_{Oi}, a_{11i}$ to $a_{33i})$ are used as parameters to calculate residuals of the first and the second formulas. The parameters $(a_{11i}$ to $a_{33i})$ are of a rotation matrix showing an attitude. At this time, a combination of $(X_j, Y_j, Z_j)$ and $(X_{Oi}, Y_{Oi}, Z_{Oi}, a_{11i}$ to $a_{33i})$ is searched for so that the residuals will be converged by the least squares method. Specifically, parallel calculation of the first and the second formulas is repeatedly performed by adding correction amounts to each of the parameters $(X_j, Y_j, Z_j)$ and $(X_{Oi}, Y_{Oi}, Z_{Oi}, a_{11i}$ to $a_{33i})$ so that the residuals showed by the first and the second formulas will be small. Thereafter, a combination of unknown parameters $(X_j, Y_j, Z_j)$ and $(X_{Oi}, Y_{Oi}, Z_{Oi}, a_{11i}$ to $a_{33i})$ by which the first and the second formulas satisfy a convergence condition is calculated. The convergence condition is a condition in which the residuals are sufficiently small or a condition in which changes in the residuals from residuals of previous calculation are sufficiently small, that is, changes in the calculation results are converged.

(4) Second Adjustment Calculation for Correction Considering Reflection Position of Prism. After values $(X_j, Y_j, Z_j)$ and $(X_{Oi}, Y_{Oi}, Z_{Oi}, a_{11i}$ to $a_{33i})$ satisfying the convergence condition are obtained as a result of the first adjustment calculation, the second adjustment calculation is performed to reflect the displacement of the reflection position of the reflective prism 202. The observation equations used in the second adjustment calculation are the first and the second formulas, which are also used in the first adjustment calculation.

The second adjustment calculation uses values that reflect the displacement of the reflection position of the reflective prism 202 as the values for $(X_{pi}, Y_{pi}, Z_{pi})$ in the second formula. The following describes the displacement of the reflection point of the reflective prism 202.

Ideally, the position of the reflection point of the reflective prism 202 is not changed, and reflection occurs at the same position at any time regardless of the incident direction. However, in an actual case, the position of the reflection point changes depending on the incident angle of the incident light to the reflective prism 202. This phenomenon and the technique for coping with this phenomenon are disclosed in, for example, Japanese Patent Application No. 2016-193216.

For example, a reflective prism may be made of multiple quadrangular-pyramid-shaped reflective prisms to correspond to a wide range of the incident angle. In this case, the positions of the reflection origins of the quadrangular-pyramid-shaped reflective prisms are not the same, which causes displacement of the reflection point depending on the incident angle in principle. Moreover, in some cases other than the above case, displacement of the reflection point may occur depending on the incident angle due to material and structure of the reflective prism. This displacement of the reflection point also affects the accuracy of the exterior orientation parameters.

Figure 4:
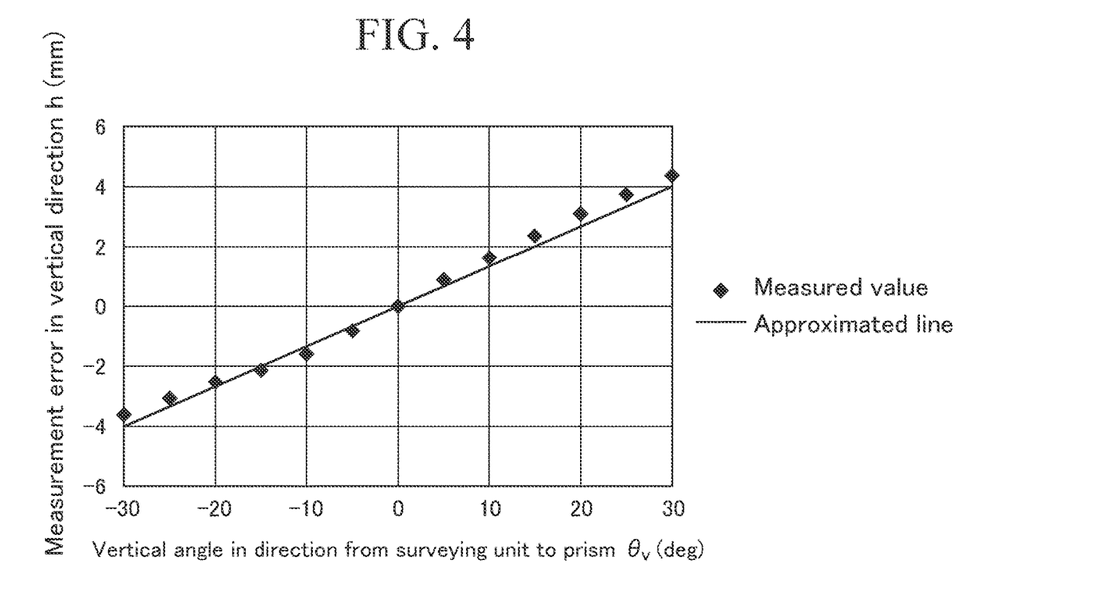
FIG. 4 is a graph showing a relationship between a vertical angle of a TS relative to a reflective prism and a position in a vertical direction of a reflection point.
Figure 5:
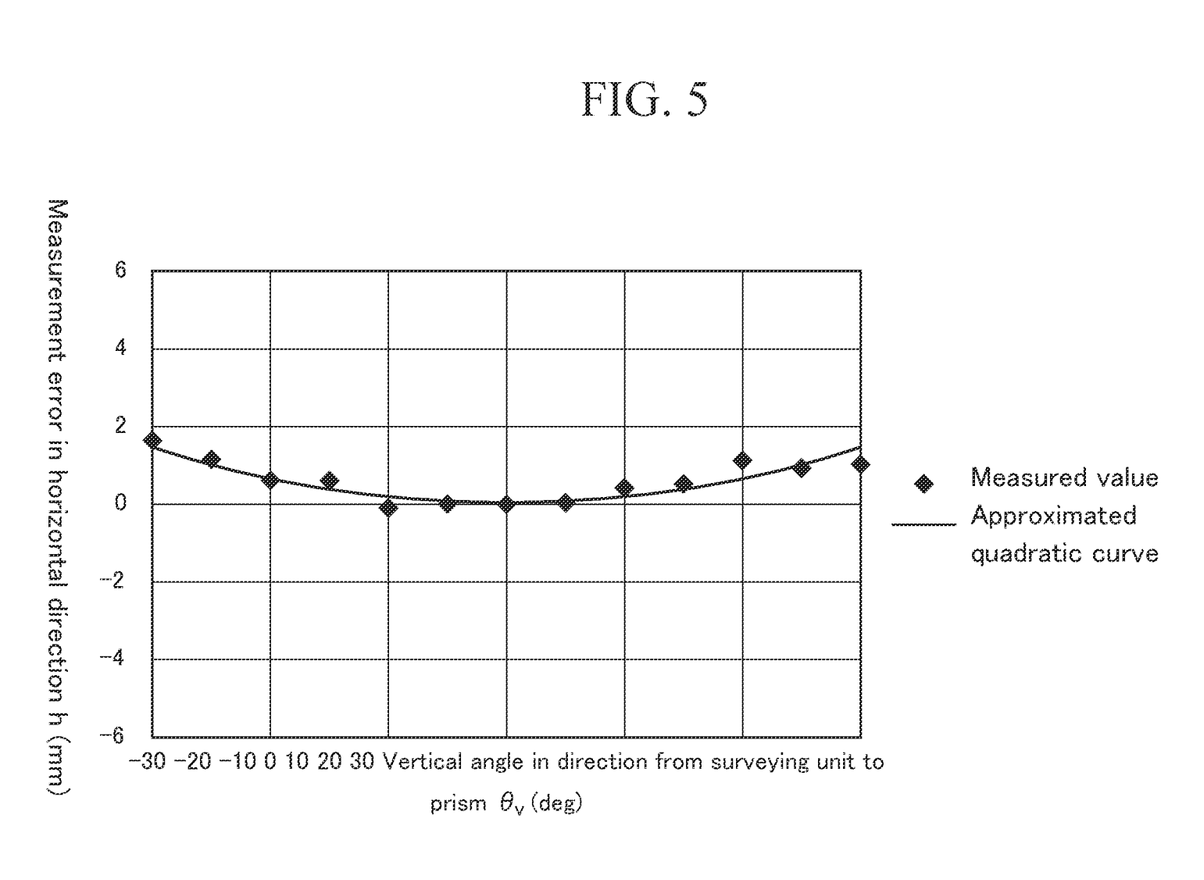
FIG. 5 is a graph showing a relationship between the vertical angle of the TS relative to the reflective prism and a position in a horizontal direction of the reflection point.

FIG. 4 shows a graph showing an example of a relationship between a vertical angle in the direction of the reflective prism as viewed from the TS, which is an angle in the vertical direction from a horizontal plane, and a displacement of the reflection point in the vertical direction, in measurement of distance to the reflective prism by the TS. FIG. 5 shows a graph showing an example of a relationship between the vertical angle and the displacement of the reflection point in the horizontal direction.

Figure 8:
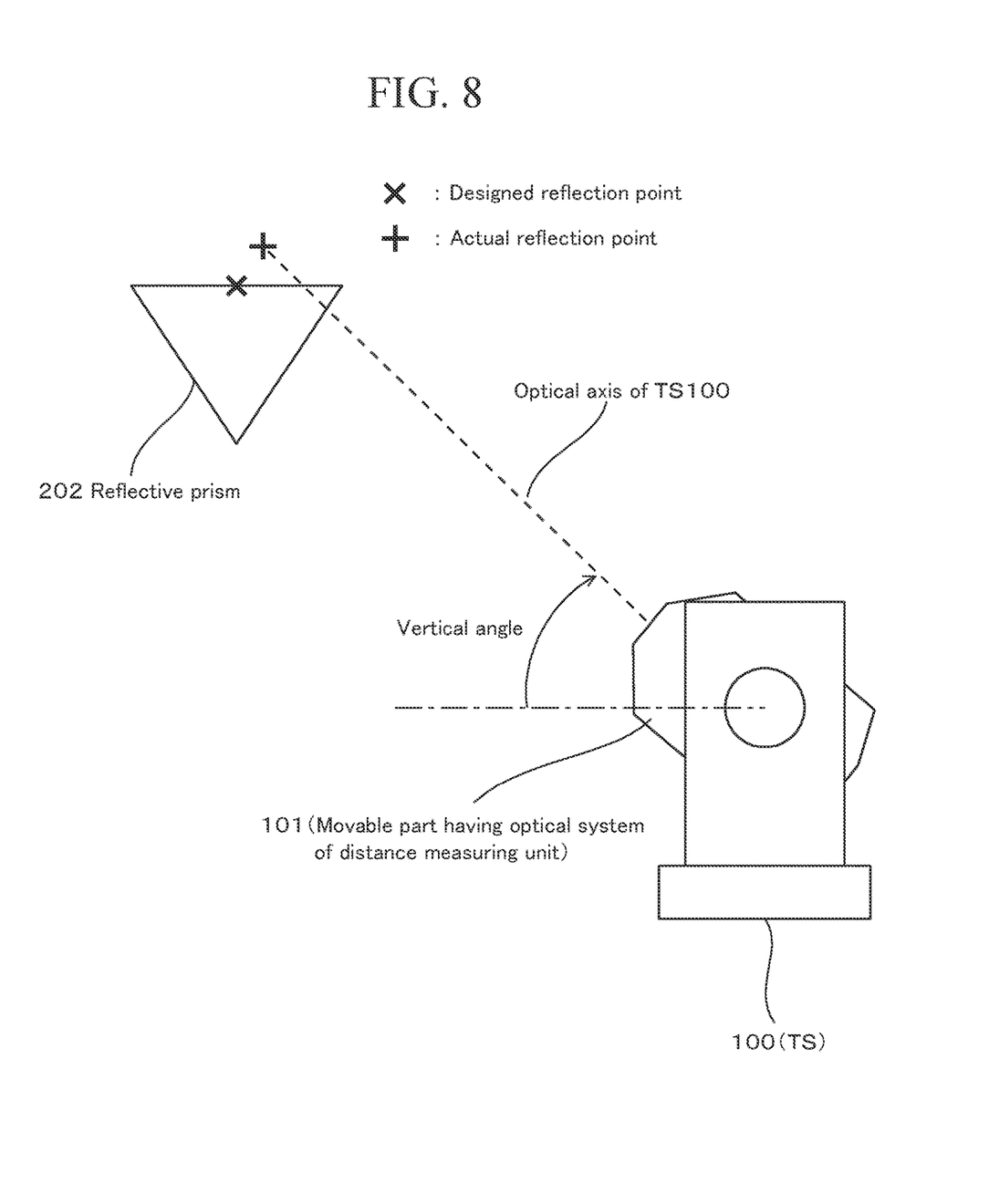
FIG. 8 is an image diagram for explaining generation of displacement of a reflection point of a reflective prism depending on an incident angle.

As illustrated in FIGS. 4 and 5, a slight measurement error occurs in the positioning data of the reflection point depending on the incident angle of the distance measuring light entering the reflective prism. FIG. 8 illustrates an image diagram conceptually showing occurrence of the measurement error in this case. FIG. 8 conceptually shows a situation in which the incident angle of distance measuring light and tracking light to the reflective prism 202 varies with the vertical angle of a movable part 101 having an optical system of a distance measuring unit of the TS 100, thereby causing displacement of an actual reflection point of the reflective prism 202 from a planned position. This displacement of the reflection point causes a margin of error in $X_{Oi}, Y_{Oi}, Z_{Oi}, a_{11i}$ to $a_{33i}, X_j, Y_j,$ and $Z_j$, which are adjusted by the first and the second formulas.

In view of this, the displacement of the reflection position is estimated from the incident angle of the distance measuring light and the tracking light to the reflective prism 202, and the influence of the displacement of the reflection point of the reflective prism 202 is corrected. For example, in a case of using a composited reflective prism that is made by combining multiple quadrangular-pyramid-shaped reflective prisms, a relationship between an incident angle and a displacement of the reflection point may be obtained in advance, and calibration data may be generated as preparation. The incident angle may be represented by a vertical angle and a horizontal angle of an optical system of a tracking unit. In this condition, positioning data is corrected on the basis of this calibration data in actual positioning. This method can also be applied to a case of using a reflective prism of other types.

In this process, a displacement of the reflection position with respect to an incident angle $\theta_V$ in the vertical direction of the reflective prism 202 and a displacement of the reflection position with respect to an incident angle $\theta_H$ in the horizontal direction of the reflective prism 202 are measured as correction data in advance. This correction data is used to determine a relationship between a correction amount $\theta_V$ in the vertical direction and a correction amount $\theta_H$ in the horizontal direction, that is, $(\Delta v, \Delta h) = f(\theta_V, \theta_H)$, in advance. The relationship $(\Delta v, \Delta h) = f(\theta_V, \theta_H)$ may be table data, a calibration curve, or a mathematical function. In this embodiment, $\theta_V$ and $\theta_H$ are defined as angles from a predetermined reference axis of the reflective prism 202.

The location $(X_{pi}, Y_{pi}, Z_{pi})$ of the reflective prism 202 at the photographing time of the image "i" is corrected as follows. First, an attitude in the absolute coordinate system of the reflective prism 202 is calculated from the rotation matrix $(a_{11i}$ to $a_{33i})$ at the photographing time of the image "i". The attitude of the reflective prism 202 and the horizontal angle and the vertical angle in the orientation direction of the TS 100 at the photographing time of the image "i" are used to calculate a vertical direction component $\theta_V$ and a horizontal direction component $\theta_H$ of an incident angle of the distance measuring light and the tracking light from the TS 100 to the reflective prism 202 at that time.

In this embodiment, the horizontal angle in the orientation direction of the TS 100 is measured in a clockwise direction from 0 degrees set in the direction of north. For example, an angle in the direction of east is 90 degrees. The vertical angle in the orientation direction of the TS 100 is measured under conditions in which an elevation angle direction is a positive angle and a depression angle direction is a negative angle while the horizontal direction is set to 0 degrees. Of course, this is merely an example, and other definitions can also be used.

Next, correction values (Δv, Δh) for the reflection position corresponding to ($\theta_V$, $\theta_H$) are obtained from the product of the previously prepared (Δv, Δh)=f($\theta_V$, $\theta_H$). The obtained values (Δv, Δh) are used to correct the values ($X_{pi}$, $Y_{pi}$, $Z_{pi}$). The corrected values for ($X_{pi}$, $Y_{pi}$, $Z_{pi}$) are used to perform the second adjustment calculation using the first and the second formulas, whereby the values $X_{0i}$, $Y_{0i}$, $Z_{0i}$, $a_{11i}$ to $a_{33i}$, $X_j$, $Y_j$, and $Z_j$, are further optimized to increase accuracy.

For example, it is assumed that a vertical angle is measured in terms of an elevation angle as a positive angle and a depression angle as a negative angle from the horizontal plane, and that a horizontal angle is measured in a clockwise direction from the direction of north set at 0 degrees. Under these conditions, in a case in which the vertical angle and the horizontal angle of the TS 100 at the photographing time of the image "i" are respectively 45 degrees and 0 degrees, and the attitude of the reflective prism 202 is represented by a vertical angle of 0 degrees and a horizontal angle of 180 degrees and horizontally orients to the south, the incident angle of the distance measuring light and the tracking light to the reflective prism 202 is minus 45 degrees in the vertical angle and 0 degrees in the horizontal angle.

Other Matters

The above method provides the exterior orientation parameters of a camera in aerial photogrammetry without using an orientation target. This technique may be implemented by installing an orientation target on a ground surface and adding a constraint condition to a feature point extracted from an image. In this case, a constraint condition represented by the following third formula is added to the parallel calculation of the first and the second formulas.

$$\sum_{j=1}^{n}(X_j - X_{Gj})^2$$

$$\sum_{j=1}^{n}(Y_j - Y_{Gj})^2$$

$$\sum_{j=1}^{n}(Z_j - Z_{Gj})^2$$

Third Formula

In the third formula, ($X_{Gj}$, $Y_{Gj}$, $Z_{Gj}$) represent a location of an orientation target installed on the ground, that is, a ground control point.

Configuration of Hardware

Figure 6:
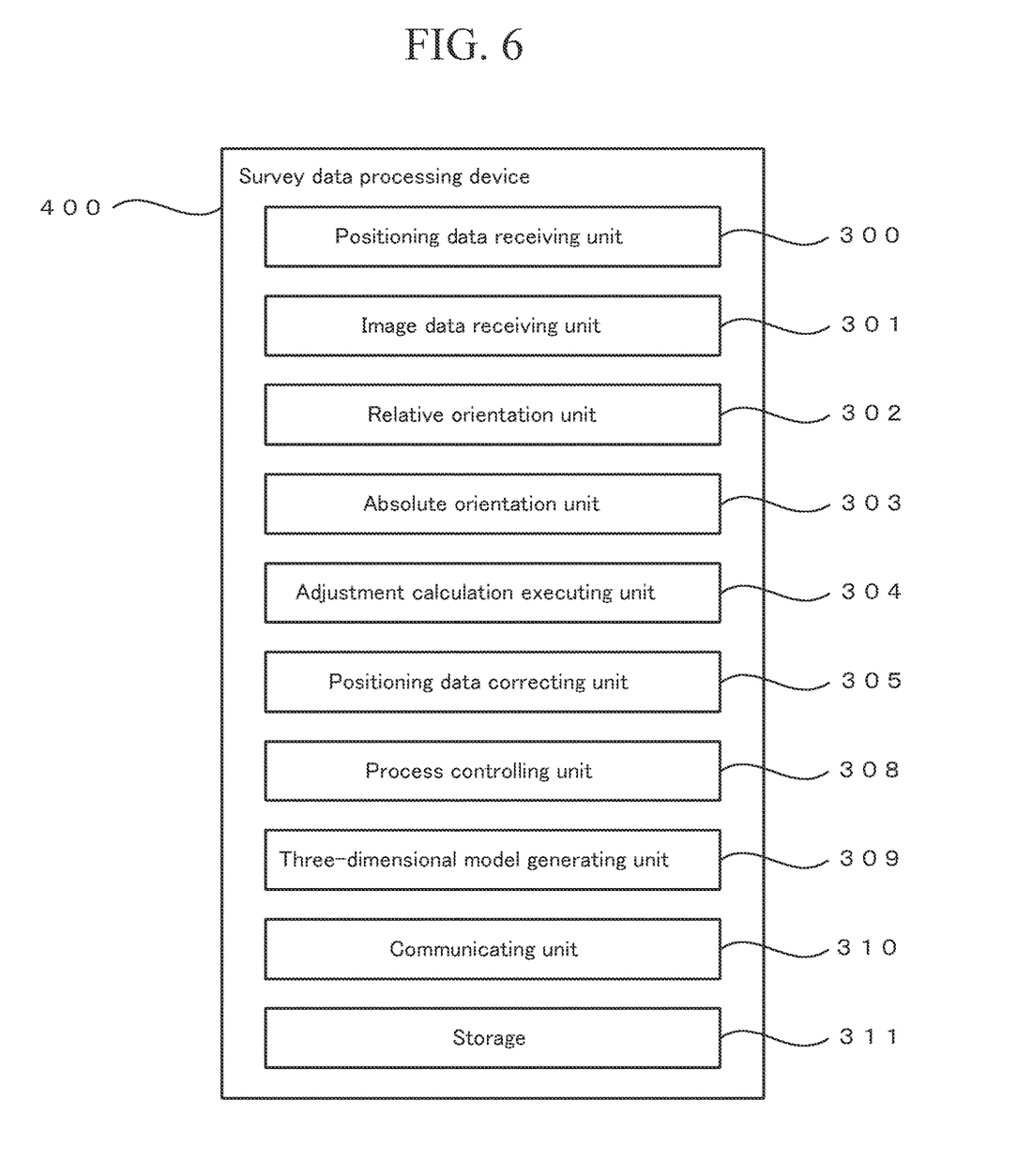
FIG. 6 shows a block diagram of a survey data processing device of the embodiment.

FIG. 6 shows a block diagram of the survey data processing device 400 that performs (1) relative orientation, (2) absolute orientation, (3) first adjustment calculation, and (4) second adjustment calculation, which are described above. The survey data processing device 400 functions as a computer. The survey data processing device 400 is constituted by using a personal computer (PC) or a work station (WS).

The survey data processing device 400 may be constituted by using a dedicated electronic circuit. For example, a part or the entirety of the survey data processing device 400 can be composed of an electronic circuit such as an FPGA. In a case of constituting the survey data processing device 400 by using a PC or a WS, a user may use a user interface such as a graphical user interface (GUI) of the PC or the WS to operate the survey data processing device 400. The survey data processing device 400 includes a positioning data receiving unit 300, an image data receiving unit 301, a relative orientation unit 302, an absolute orientation unit 303, an adjustment calculation executing unit 304, a positioning data correcting unit 305, a process controlling unit 308, a three-dimensional model generating unit 309, a communicating unit 310, and a storage 311.

The positioning data receiving unit 300 receives location data of the UAV 200 positioned by the TS 100. In this embodiment, location data of the reflective prism 202 is received. This location data contains location ($X_{pi}$, $Y_{pi}$, $Z_{pi}$) in the absolute coordinate system of the reflective prism 202 at the photographing time of an image "i".

The image data receiving unit 301 receives image data of photographed images taken by the camera 201. This image data is associated with data of photographing time. In one example, the data of the photographed images taken by the camera 201, as well as data of location and attitude of the camera 201 at the photographing time, which is obtained by the UAV 200, may be received by the image data receiving unit 301.

The relative orientation unit 302 extracts multiple photographed images containing the same object from the image data received by the image data receiving unit 301 and subjects the extracted photographed images to the relative orientation. This process generates a relative three-dimensional model in which relative relationships between a great number of feature points extracted from each of the multiple photographed images, which are consecutively taken, and exterior orientation parameters of the camera 201 taking the multiple photographed images, are determined. Then, the process calculates relative exterior orientation parameters of the camera 201 corresponding to each of the photographed images.

The absolute orientation unit 303 uses the result of the relative orientation performed by the relative orientation unit 302 to perform the absolute orientation. In this process, a movement path S of the camera 201 in the relative orientation-based relative three-dimensional model is compared with a movement path S' of the UAV 200 obtained by tracking the reflective prism 202 by the TS 100, and scale adjustment, parallel movement, and rotational movement of the relative three-dimensional model are performed so that the difference between the movement path S and the movement path S' will be minimum. After the difference becomes minimal, a true scale is added to the relative three-dimensional model, and direction in the absolute coordinate system that describes the movement path S is determined.

The adjustment calculation executing unit 304 performs the first and the second adjustment calculations. This process performs the bundle adjustment calculation using the first formula and also performs an adjustment calculation using the second formula for minimizing a margin of error caused by the difference of the position between the camera and the reflective prism. The first and the second formulas are performed concurrently, and three-dimensional coordinates of the feature points extracted from the photographed images and the exterior orientation parameters of the camera 201 corresponding to each of the photographed images are optimized.

The positioning data correcting unit 305 corrects displacement of the reflection position of the reflection point that depends on the incident angle of the incident light to the reflective prism 202. Specifically, it is assumed that an incident angle in the vertical direction and an incident angle in the horizontal direction to the reflective prism 202 are respectively represented as $\theta_V$ and $\theta_H$, and a correction amount in the vertical direction and a correction amount in the horizontal direction of the reflection point are respectively represented as Δv and Δh. Under these conditions, the value ($\Delta v$, $\Delta h$)=$f(\theta_V, \theta_H)$ is calculated in advance, and this data is stored in the storage 311 or an appropriate storage region. In this condition, the values ($\Delta v$, $\Delta h$) are calculated from the values ($\theta_V$, $\theta_H$) on the basis of the preliminarily obtained ($\Delta v$, $\Delta h$)=$f(\theta_V, \theta_H)$, and the positioning data obtained by the TS 100 is corrected in actual positioning. This process is performed by the positioning data correcting unit 305.

At this time, the values ($\theta_V$, $\theta_H$) are calculated from the orientation direction of the distance measuring unit of the TS 100 in terms of the vertical direction angle and the horizontal angle and from the attitude of the camera 201 or of the reflective prism 202. The attitude is obtained from the rotation matrix ($a_{11i}$ to $a_{33i}$).

The process controlling unit 308 controls the procedure and the timing of the process performed by the survey data processing device 400. The function of the process controlling unit 308 is implemented by a CPU of the hardware, such as a PC or a WS, constituting the survey data processing device 400. The three-dimensional model generating unit 309 generates a three-dimensional model on the basis of the photographed images taken by the camera 201, by using the three-dimensional coordinates of the feature points obtained as a result of the adjustment calculation. The generation of the three-dimensional model on the basis of the images is, for example, disclosed in WO 2011/070927 and Japanese Unexamined Patent Applications Laid-Open Nos. 2012-230594 and 2014-035702.

The communicating unit 310 communicates with an external device. In the case of constituting the survey data processing device 400 by using a PC or a WS, the communicating unit 310 is implemented by using an interface function or a communication function of the PC or the WS. The storage 311 stores a program and data necessary to operate the survey data processing device 400, data obtained as a result of the operation of the survey data processing device 400, and other information. In the case of constituting the survey data processing device 400 by using a PC or a WS, the storage 311 is implemented by using a semiconductor memory or a hard disk unit of the PC or the WS.

Example of Process Procedure

Figure 7:
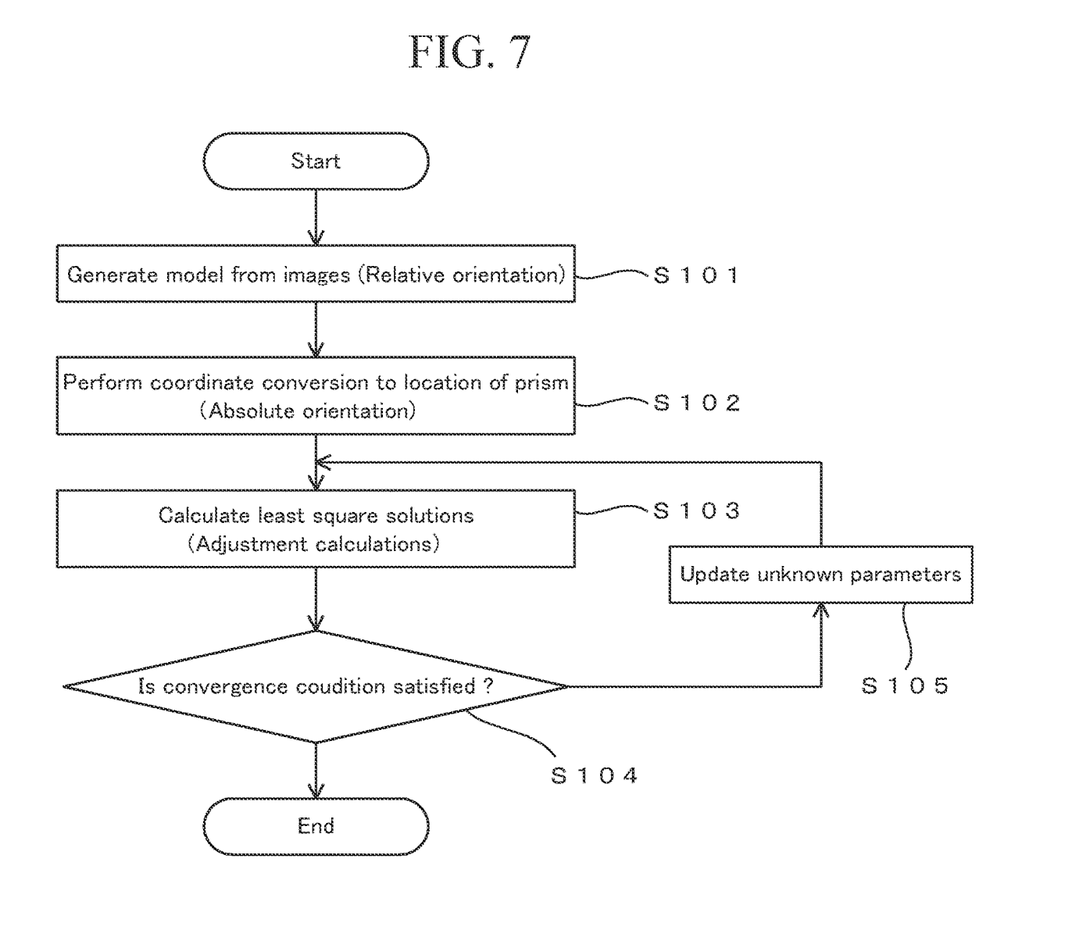
FIG. 7 is a flow chart showing an example of a process procedure.

FIG. 7 shows a flowchart showing an example of a process performed by the survey data processing device 400. The program for executing the process in FIG. 7 is stored in the storage 311 of the survey data processing device 400 and is run by the process controlling unit 308. Alternatively, the program may be stored in an appropriate storage medium and may be provided therefrom.

After the process starts, a three-dimensional model having no true scale, that is, a relative three-dimensional model, is generated on the basis of the photographed image taken from the UAV 200 (step S101). This process performs the relative orientation and calculates relative exterior orientation parameters of the camera 201 corresponding to each of the photographed images.

Next, scale adjustment, parallel movement, and rotational movement of the relative three-dimensional model are performed so that the movement path S of the camera 201 in the relative three-dimensional model, which is generated in step S101, will be fit to the movement path S' of the location of the reflective prism 202 positioned by the TS 100. Thus, the relative three-dimensional model is subjected to the coordinate conversion based on the location of the reflective prism 202 (step S102). As a result, the relative three-dimensional model generated in step S101 is converted into a three-dimensional model that is described in the absolute coordinate system, and three-dimensional coordinates ($X_j$, $Y_j$, $Z_j$) in the absolute coordinate system of a feature point in each of the photographed images and exterior orientation parameters ($X_{0i}$, $Y_{0i}$, $Z_{0i}$, $a_{11i}$ to $a_{33i}$) in the absolute coordinate system of the camera corresponding to an image "i" are obtained.

Thereafter, the first and the second adjustment calculations are performed (step S103). This process calculates least square solutions of the first and the second formulas to optimize the values ($X_j$, $Y_j$, $Z_j$) and ($X_{0i}$, $Y_{0i}$, $Z_{0i}$, $a_{11i}$ to $a_{33i}$). Meanwhile, the determination in step S 104 is performed. If the convergence condition is satisfied, the process is finished, and the values of the three-dimensional coordinates ($X_j$, $Y_j$, $Z_j$) of the feature point and the exterior orientation parameters ($X_{0i}$, $Y_{0i}$, $Z_{0i}$, $a_{11i}$ to $a_{33i}$) are determined. If the convergence condition is not satisfied, values of unknown parameters ($X_j$, $Y_j$, $Z_j$) and ($X_{0i}$, $Y_{0i}$, $Z_{0i}$, $a_{11i}$ to $a_{33i}$) are updated (step S105), and the adjustment calculations are performed again. In an actual case, the update of the unknown parameters is performed many times, and the values ($X_j$, $Y_j$, $Z_j$) and ($X_{0i}$, $Y_{0i}$, $Z_{0i}$, $a_{11i}$ to $a_{33i}$) are determined at the time the convergence condition is satisfied.

Advantages

The relative orientation enables generating a relative three-dimensional model that describes the movement path S of the camera 201. On the other hand, the reflective prism 202 mounted on the UAV 200 is positioned by the TS 100, and the movement path S' in the absolute coordinate system of the reflective prism 202 is determined in terms of measured values.

After the relative orientation is performed, the absolute orientation is performed. The absolute orientation is performed by subjecting the relative three-dimensional model to scale adjustment, parallel movement, and rotational movement so that the movement path S in the relative three-dimensional model will be fit to the movement path S' in the absolute coordinate system in terms of measured values. The fitting of the movement path S to the movement path S' in the absolute coordinate system provides direction and a true scale in the absolute coordinate system to the relative orientation-based relative three-dimensional model.

This method provides exterior orientation parameters of the camera 201 corresponding to each of the photographed images without using an orientation target.

After the absolute orientation is performed, the adjustment calculation using the first and the second formulas is performed concurrently in the first adjustment calculation, to optimize the three-dimensional coordinates ($X_j$, $Y_j$, $Z_j$) of the feature point of the photographed object and the exterior orientation parameters ($X_{0i}$, $Y_{0i}$, $Z_{0i}$, $a_{11i}$ to $a_{33i}$) of the camera 201. At the time of performing the bundle adjustment calculation using the first formula, the adjustment calculation using the second formula is performed concurrently, thereby reducing the influence of the margin of error due to the difference of the position between the camera 201 and the reflective prism 202 on each of the parameters.

After the first adjustment calculation is converged, the second adjustment calculation is performed. The second adjustment calculation is performed in a similar manner as in the first adjustment calculation, by an adjustment calculation considering information of deviation of the reflection position depending on the incident angle of the distance measuring light and the tracking light from the TS 100 to the reflective prism 202. This process further optimizes the values of the three-dimensional coordinates ($X_j$, $Y_j$, $Z_j$) of the feature point of the photographed object and the exterior orientation parameters ($X_{Oi}$, $Y_{Oi}$, $Z_{Oi}$, $a_{11i}$ to $a_{33i}$) of the camera 201.

The execution of the second adjustment calculation reduces the influence of the positioning error depending on the incident angle of the distance measuring light and the tracking light to the reflective prism 202, whereby the values ($X_j$, $Y_j$, $Z_j$) and ($X_{Oi}$, $Y_{Oi}$, $Z_{Oi}$, $a_{11i}$ to $a_{33i}$) are obtained at further higher accuracy. This increases the accuracy of the aerial photogrammetry using the UAV 100, thereby providing a highly accurate three-dimensional model relating to an object to be surveyed.

Other Applications of Present Invention

The correction of the positioned location by using the incident angle of the distance measuring light and the tracking light to the reflective prism 202 can be used in a general technique of making the TS 100 position the UAV 200 while in flight. For example, in a case of making a TS 100 track a UAV 200 that flies for aerial photographing, the above technique of correcting the positioned location can be used.

What is claimed is:

1. A survey data processing device comprising:
   a positioning data receiving unit configured to receive positioning data, the positioning data being obtained through tracking and positioning a reflective prism of an aerial vehicle by a total station, the aerial vehicle mounted with the reflective prism and a camera in which positional relationship and attitude relationship therebetween are known;
   a relative orientation unit configured to calculate relative exterior orientation parameters of the camera by relative orientation using photographed images taken by the camera;
   an absolute orientation unit configured to obtain absolute values for the relative exterior orientation parameters by absolute orientation on a basis of the positioning data and the relative exterior orientation parameters;
   an adjustment calculation executing unit configured to correct the absolute values for the relative exterior orientation parameters on a basis of a position relationship between the camera and the reflective prism, which is preliminarily obtained; and
   a positioning data correcting unit configured to correct the positioning data of the reflective prism,
   wherein displacement of a reflection point of the reflective prism occurs depending on an incident angle of each of measurement light and tracking light from the total station,
   a relationship between the incident angle of each of the measurement light and the tracking light from the total station to the reflective prism and the displacement of the reflection point of each of the measurement light and the tracking light on the reflective prism is preliminarily obtained, and
   the positioning data correcting unit corrects the positioning data on a basis of attitude in an absolute coordinate system of the reflection prism, which is obtained from the corrected absolute values for the relative exterior orientation parameters, the incident angle of each of the measurement light and the tracking light from the total station to the reflective prism, and the preliminarily obtained relationship between the incident angle to the reflective prism and the displacement of the reflection point.

2. The survey data processing device according to claim 1, wherein the relative orientation provides a relative movement path of the camera with respect to an object in a photographed image, and the absolute orientation performs coordinate conversion of the relative movement path to a positioning data-based movement path of the camera and thereby provides the absolute values to the relative exterior orientation parameters.

3. The survey data processing device according to claim 1, wherein the relative orientation enables generation of a relative three-dimensional model in which a relative relationship between an object in a photographed image and exterior orientation parameters of the camera at a time of taking the photographed image, and the absolute orientation performs scale adjustment, parallel movement, and rotation movement of the relative three-dimensional model so that a relative movement path of the camera in the relative three-dimensional model is fit to a positioning data-based movement path of the camera.

4. The survey data processing device according to claim 1, wherein, in a condition in which a vertical direction component of the incident angle of the measurement light from the total station to the reflective prism is denoted by $\theta_V$, a horizontal direction component of the incident angle of the measurement light from the total station to the reflective prism is denoted by $\theta_H$, a correction amount in the vertical direction of the positioning data is denoted by $\Delta v$, and a correction amount in the horizontal direction of the positioning data is denoted by $\Delta h$,
   a relationship $(\Delta v, \Delta h) = f(\theta_V, \theta_H)$ is established,
   the attitude of the reflective prism is calculated from the corrected absolute values for the exterior orientation parameters,
   the vertical direction component $\theta v$ and the horizontal direction component $\theta H$ are calculated from the attitude of the reflective prism and an orienting direction of the total station,
   the correction amounts in the vertical direction and the horizontal direction $\Delta v$ and $\Delta h$ are obtained from the relationship $(\Delta v, \Delta h) = f(\theta_V, \theta_H)$, and
   the positioning data is corrected with use of the obtained correction amounts in the vertical direction and the horizontal direction $\Delta v$ and $\Delta h$.

5. A survey data processing method comprising:
   receiving positioning data, the positioning data being obtained through tracking and positioning a reflective prism of an aerial vehicle by a total station, the aerial vehicle mounted with the reflective prism and a camera in which positional relationship and attitude relationship therebetween are known;
   calculating relative exterior orientation parameters of the camera by relative orientation using photographed images taken by the camera;
   obtaining absolute values for the relative exterior orientation parameters by absolute orientation on a basis of the positioning data and the relative exterior orientation parameters; and
   correcting the absolute values for the relative exterior orientation parameters on a basis of a position relationship between the camera and the reflective prism, which is preliminarily obtained; and
   correcting the positioning data of the reflective prism,
   wherein displacement of a reflection point of the reflective prism occurs depending on an incident angle of each of measurement light and tracking light from the total station,
   a relationship between the incident angle of each of the measurement light and the tracking light from the total station to the reflective prism and the displacement of the reflection point of each of the measurement light and the tracking light on the reflective prism is preliminarily obtained, and the positioning data of the reflective prism is corrected on a basis of attitude in an absolute coordinate system of the reflection prism, which is obtained from the corrected absolute values for the corrected relative exterior orientation parameters, the incident angle of each of the measurement light and the tracking light from the total station to the reflective prism, and the preliminarily obtained relationship between the incident angle to the reflective prism and the displacement of the reflection point.

6. A survey data processing device comprising a processor, the processor configured to:

receive positioning data, the positioning data being obtained through tracking and positioning a reflective prism of an aerial vehicle by a total station, the aerial vehicle mounted with the reflective prism and a camera in which positional relationship and attitude relationship therebetween are known;

calculate relative exterior orientation parameters of the camera by relative orientation using photographed images taken by the camera;

obtain absolute values for the relative exterior orientation parameters by absolute orientation on a basis of the positioning data and the relative exterior orientation parameters;

correct the absolute values for the relative exterior orientation parameters on a basis of a position relationship between the camera and the reflective prism, which is preliminarily obtained; and correct the positioning data of the reflective prism, wherein displacement of a reflection point of the reflective prism occurs depending on an incident angle of each of measurement light and tracking light from the total station, a relationship between the incident angle of each of the measurement light and the tracking light from the total station to the reflective prism and the displacement of the reflection point of each of the measurement light and the tracking light on the reflective prism is preliminarily obtained, and the positioning data of the reflective prism is corrected on a basis of attitude in an absolute coordinate system of the reflection prism, which is obtained from the corrected absolute values for the corrected relative exterior orientation parameters, the incident angle of each of the measurement light and the tracking light from the total station to the reflective prism, and the preliminarily obtained relationship between the incident angle to the reflective prism and the displacement of the reflection point.

* * * * *